US012579539B2

(12) United States Patent
Barbar et al.

(10) Patent No.: US 12,579,539 B2
(45) Date of Patent: Mar. 17, 2026

(54) SYSTEMS AND METHODS FOR NETWORK MODELLED DATA

(71) Applicant: CARBON ARC, New York, NY (US)

(72) Inventors: Marc F. Barbar, New York, NY (US); Kirk D. Mckeown, New York, NY (US); Eileen K. Murray, New York, NY (US); Timothy R. Walsh, New York, NY (US)

(73) Assignee: CARBON ARC, New York, NY (US)

( * ) Notice: Subject to any disclaimer, the term of this patent is extended or adjusted under 35 U.S.C. 154(b) by 165 days.

(21) Appl. No.: 18/244,607

(22) Filed: Sep. 11, 2023

(65) Prior Publication Data

US 2024/0144248 A1     May 2, 2024

Related U.S. Application Data

(60) Provisional application No. 63/381,517, filed on Oct. 28, 2022.

(51) Int. Cl.
*G06Q 20/36*     (2012.01)
*G06Q 20/40*     (2012.01)

(52) U.S. Cl.
CPC ....... *G06Q 20/3674* (2013.01); *G06Q 20/363* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 9,058,317 B1* | 6/2015 | Gardner | G06F 40/268 |
| 9,767,409 B1* | 9/2017 | Makhijani | G06N 3/09 |
| 2020/0193459 A1* | 6/2020 | Chakraborty | G06F 18/23 |
| 2022/0166782 A1* | 5/2022 | Zoldi | G06Q 20/4016 |
| 2022/0318209 A1* | 10/2022 | Allen | G06F 16/2465 |

(Continued)

OTHER PUBLICATIONS

Lam Duc Nguyen et. al., "A Marketplace for Trading AI Models based on Blockchain and Incentives for IoT Data", Dec. 6, 2021 (Year: 2021).*

*Primary Examiner* — Patrick Mcatee
*Assistant Examiner* — Timothy Paul Sax
(74) *Attorney, Agent, or Firm* — Nicholas Martin; Greenberg Traurig, LLP

(57) ABSTRACT

Disclosed are systems and methods that provide a novel framework for the creation, management and electronic transfer of electronic, machine-readable data as tangible digital assets accessible from a network storage (e.g., blockchain, for example), which can be utilized by entities via native and/or third party software. The disclosed framework can operate by transforming data in a raw static format to a liquid format through standardization and factorization. The data can be standardized via tags associated with governance and policy frameworks, as well as infrastructure requirements. In some embodiments, the (tagged) data can be factorized to create data (or containers, data models or collections of containers/models) as labeled, intelligent data. And, the framework can then electronically transfer the labeled data. As a result, capabilities of data liquidity can be achieved via a web-agnostic storage and framework accessible through smart contracts.

20 Claims, 9 Drawing Sheets

(56) References Cited

U.S. PATENT DOCUMENTS

| | | | |
|---|---|---|---|
| 2023/0259788 A1* | 8/2023 | Eelen | G06N 3/105 |
| | | | 706/25 |
| 2023/0325153 A1* | 10/2023 | Ghosh | G06F 8/35 |
| | | | 717/106 |
| 2023/0359709 A1* | 11/2023 | Nickerson | G06V 20/20 |
| 2023/0359774 A1* | 11/2023 | Zhao | G06F 21/64 |
| 2025/0094634 A1* | 3/2025 | Jones | G06F 21/6254 |

* cited by examiner

300

Theme 302

Regulation 304

Market structure 306

Supply chain 308

Business models 310

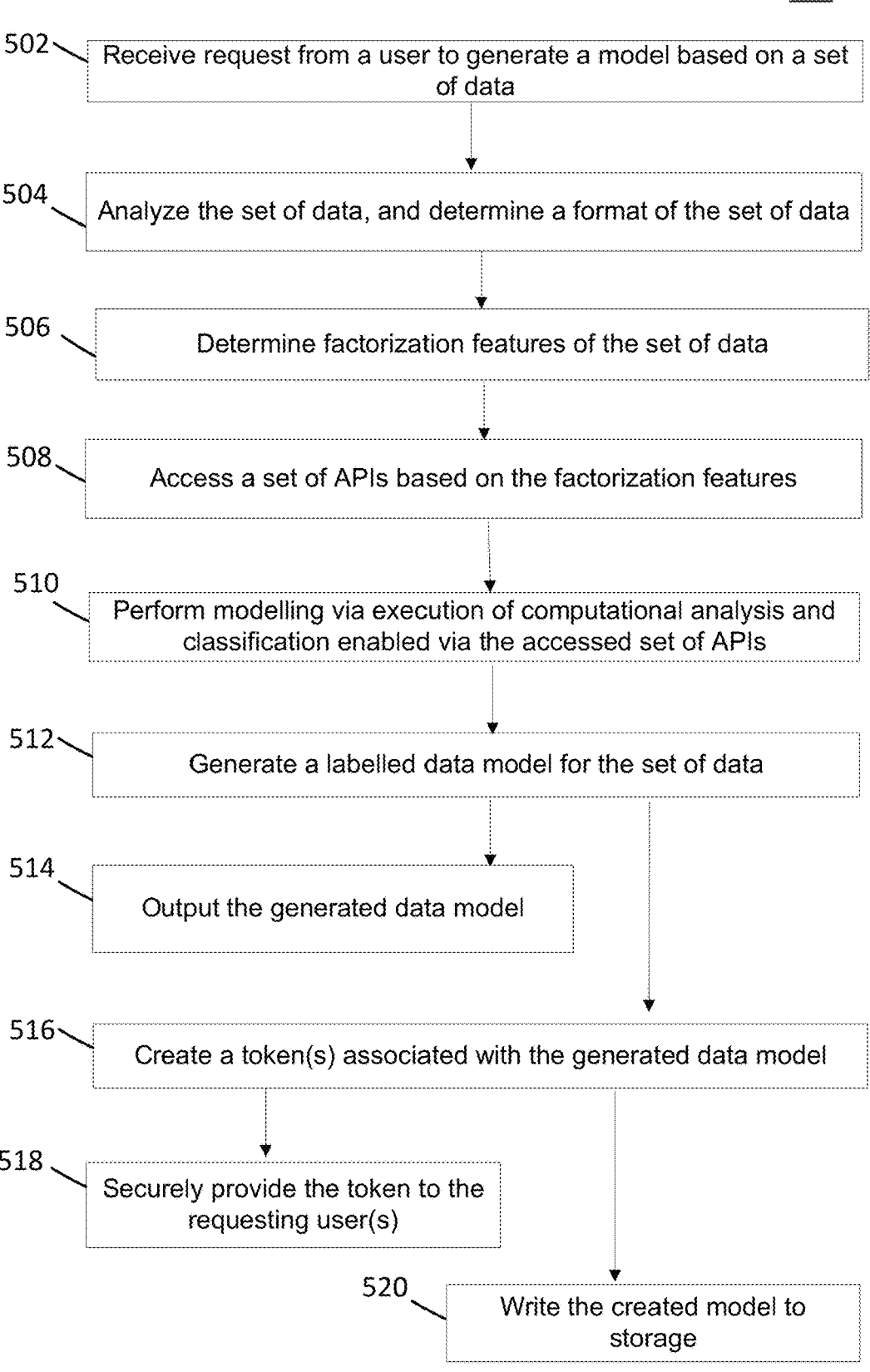

502 Receive request from a user to generate a model based on a set of data

504 Analyze the set of data, and determine a format of the set of data

506 Determine factorization features of the set of data

508 Access a set of APIs based on the factorization features

510 Perform modelling via execution of computational analysis and classification enabled via the accessed set of APIs 512 Generate a labelled data model for the set of data 514 Output the generated data model 516 Create a token(s) associated with the generated data model 518 Securely provide the token to the requesting user(s)

520 Write the created model to storage

FIG. 5

SYSTEMS AND METHODS FOR NETWORK MODELLED DATA

This application claims the benefit of priority from U.S. Provisional Patent Application No. 63/381,517, filed on Oct. 28, 2022, which is incorporated herein in its entirety by reference.

FIELD OF THE DISCLOSURE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure is generally related to electronic data modelling, and more particularly, related to the generation, modification and/or communication of data models that enable computational transactions to be formulated and compiled in a real-time (or substantially real-time (e.g., near-real time) manner and/or on a per request basis.

BACKGROUND

Currently, the use and reliance on machine learning (ML) and artificial intelligence (AI) technologies is ubiquitous. However, the effectiveness of the data modelling performed by such technologies is limited to the data being input into such machines.

SUMMARY OF THE DISCLOSURE

According to some embodiments, the disclosed systems and methods provide a novel computerized framework that provides functionality for the management and transfer of electronic data via the creation, hosting and trading of machine-readable data in exchange for value. According to some embodiments, data utilized by entities (e.g., inclusive of companies, networks, and users, for example), as well as the data input and analyzed by conventional ML/AI technologies, operates and/or is treated as a static data structure. That is, the data market such companies and/or technologies are relying on, and/or are basing their entire businesses on is oligopolistic through limited data collection and data warehousing. As disclosed herein, the disclosed systems and methods enable the creation, manipulation and trading of data and data models as a tangible asset. Thus, rather than simply viewing data as a source for analysis (e.g., big data methodologies), the disclosed framework creates a new form of digital asset that can be used to drive a business, which can lead to increased resource opportunities and operational efficiencies by entities operating on the Internet.

By way of background, as one of ordinary skill in the art would understand, the world is entering the next phase of the web—for example, "Web3", which refers to a decentralized online ecosystem based on blockchain. Currently, entities (e.g., companies, as well as collective industries and user-bases) are competing on how they use data, not software. That is, software is mature, and has created natural silos for data, which can become trapped through a shortage of know-how, weak governance, no liquidity, and hard to measure return on investment (ROI).

With the onset of emerging technologies, new data (e.g., inclusive of newly generated data, newly structured and/or formatted data, and the like) have become the building blocks for the era of digital transformation (DT) and decision intelligence (DI).

The disclosed system and methods, and the structured computerized framework they provide, enable an improved way to create, manage and utilize data. Such electronic data, for example, can include existing data provided and/or collected from a network and/or data repositories associated therewith, as well as data created via the disclosed data factorization. As discussed herein, the disclosed framework enables the synthesis of data products that is scalable, compliant, high quality and complete. As evident from the instant disclosure, the provided framework's functionality provides novel technical capabilities for creating and transforming data/data models (e.g., as secure data structures) that enables existing and to be developed software to execute more accurately and more efficiently.

Therefore, in addition to the newly created ways of handling and processing data, the disclosed framework can evidence an increase in the computational efficiency online systems operate, while maintaining a security and governance level compliant with applied policies.

According to some embodiments, a method is disclosed for the factorization and, based therefrom, creation of electronic, machine-readable data models for use by entities and/or the technologies they employ. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for a novel and improved framework for the factorization and, based therefrom, creation of electronic data models for use by entities and/or the technologies they employ.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 illustrates an exemplary data flow according to some embodiments of the present disclosure;

DETAILED DESCRIPTION

Figure 1:
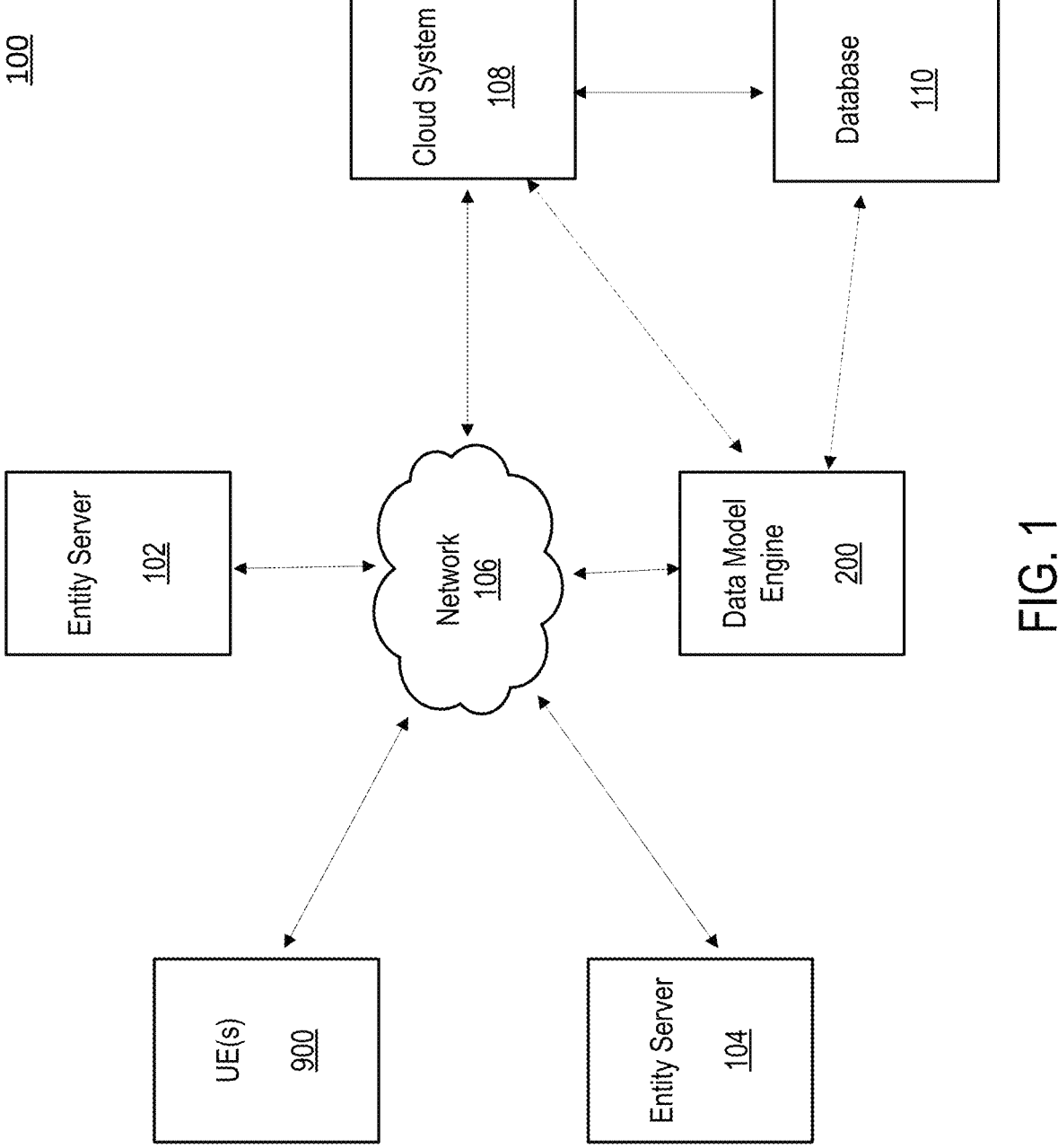
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures.

By way of background, as discussed above, most currently operating companies worldwide utilize data as intangible assets viewable only on their balance sheets. This, among other drawbacks, results in a lack of liquidity, as well as restricted agility in applying and understanding the scope of what the data provides. Moreover, there is currently no marketplace for the transacting between entities of data in a liquid, secure and efficient way. In fact, historically, data liquidity has not been of interest to most companies around the world because of the technical restrictions and shortcomings of current technologies, which inhibits or altogether prevents their ability to provide scalable insight data generation.

The disclosed systems and methods provide novel technology that is based on the foundations that data is non-fungible, and therefore can be containerized. As such, containerized data can be analyzed to provide novel insights that enable data transfer at a liquidity level not seen outside of existing markets. As discussed herein, the disclosed framework, therefore, evidences a data factorization methodology that solves the current data liquidity issues impacting industries worldwide.

According some embodiments, as discussed herein, the disclosed framework can operate by transforming data from a raw static format to a liquid format through standardization, factorization and monetization. In some embodiments, the data can be standardized via tags associated with governance and policy frameworks, as well as infrastructure requirements. In some embodiments, the (tagged) data can be factorized to create data (e.g., containers, data models or collections of containers/models) as labeled, intelligent data. And, in some embodiments, the framework can then monetize (e.g., transfer, sell, auction, share, host, upload, download, and the like) the labeled data. As a result, capabilities of data liquidity can be achieved, whereby cost attribution and remittances can be computed through a web-agnostic storage and/or framework accessible through smart contracts.

With reference to FIG. 1, system 100 is depicted which includes UE 900 (e.g., a client device, as mentioned above and discussed below in relation to FIG. 9), entity servers 102 and 104, network 106, cloud system 108, database 110 and data model engine 200. It should be understood that while system 100 is depicted as including such components, it should not be construed as limiting, as one of ordinary skill in the art would readily understand that varying numbers of UEs, servers, cloud systems, databases and networks can be utilized; however, for purposes of explanation, system 100 is discussed in relation to the example depiction in FIG. 1.

According to some embodiments, UE 900 can be any type of device, such as, but not limited to, a mobile phone, tablet, laptop, sensor, Internet of Things (IoT) device, autonomous machine, and any other device equipped with a cellular or wireless or wired transceiver. In some embodiments, UE 900 can be associated with a user, entity, business, company, network, portal, and the like. In some embodiments, UE 900 can be associated with a user associated with entity server 102/104.

According to some embodiments, entity servers 102 and 104 correspond to a server(s) associated with an entity. It should be understood that each server 102 and 104 can be multiple servers, and can be any type of server, including, but not limited to, a banking server, gaming server, authentication server, search server, email server, social networking server, SMS server, IM server, MMS server, exchange server, enterprise server, music sharing server, photo-sharing server, travel server, and the like. Thus, the entities associated with servers 102 and 104 can be any type of entity, and be associated with any type of business. For example, entity 102 can be associated with a sports team (e.g., New York Giants®), while entity 104 can be associated with a bank (e.g., Wells Fargo®). Thus, it should be understood that entity servers 102 and 104 are provided in system 100 to evidence that any type of entity (e.g., business, company, user, portal, and network, and the like—for example, banks, users, firms, people, accounts, applications, companies, governments, wallets, and the like, or some combination thereof) can be connected to network 106 and utilize the functionality provided by engine 200, as hosted by cloud system 108, as discussed herein.

In some embodiments, network 106 can be any type of network, such as, but not limited to, a wireless network, cellular network, the Internet, and the like (as discussed above). Network 106 facilitates connectivity of the components of system 100, as illustrated in FIG. 1.

According to some embodiments, cloud system 108 may be any type of cloud operating platform and/or network based system upon which applications, operations, and/or other forms of network resources may be located. For example, system 108 may be a service provider and/or network provider from where services and/or applications may be accessed, sourced or executed from. For example, system 108 can represent the "Carbon Arc" architecture hosted on the internet (e.g., network 106), which enables (via engine 200) the digital data asset factorization and management discussed herein.

For example, system 108 can provide UE 900 and/or entities 102-104 a programming interface that enables a search for data, whereby the search identifies a set of data that can be factorized and stored according to the disclosed systems and methods. In some embodiments, therefore, system 108 can host and/or provide a network resource that enables users access to engine 200's capabilities—for example, the network resource can be a web page, web site, portal, application, and the like, or some combination thereof.

In some embodiments, cloud system 108 may include a server(s) and/or a database of information which is accessible over network 106. In some embodiments, a database 110 of cloud system 108 may store a dataset of data and metadata associated with local and/or network information related to a user(s) of UE 900 and the UE 900, entity servers 102 and 104, and the services and applications provided by cloud system 108 and/or data model engine 200. In some embodiments, database 110 can be any type of known or to be known data storage on a network, including, but not limited to, a look-up table (LUT), a node on a network, an edge device, peer on a network, file storage, block storage, object storage, blockchain, object orientated database, distributed database, centralized database, and the like, In some embodiments, for example, cloud system 108 can provide a private/proprietary management/settlement platform, whereby engine 200, discussed infra, corresponds to the novel functionality system 108 introduces, hosts and provides to a network 106 and other platforms operating thereon. Accordingly, according to at least some embodiments, system 108 may be configured to receive, handle, process, manage, monitor, settle and/or decline transaction requests to/from users and/or entities (e.g., entity servers 102 and 104).

Figure 7:
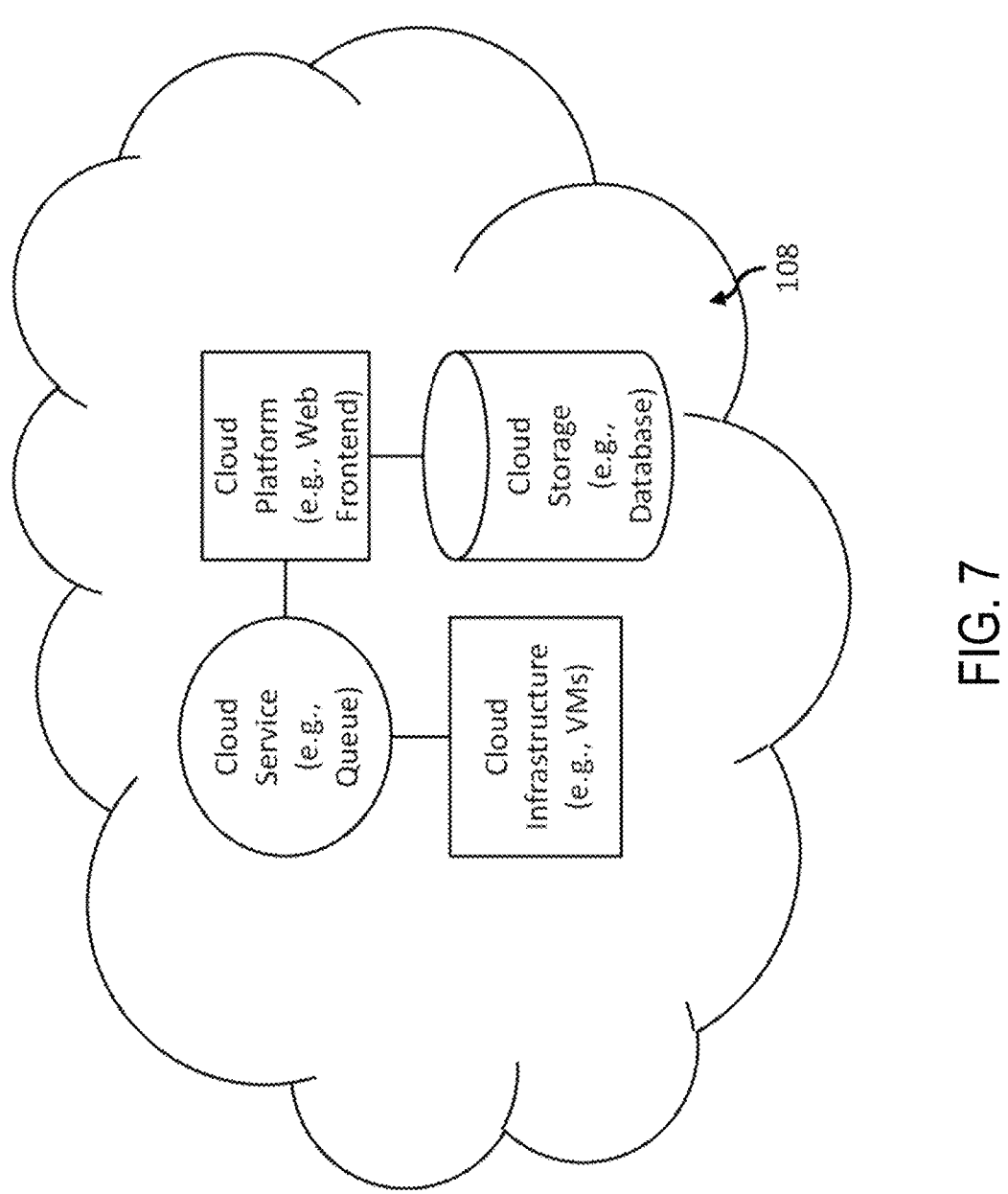
FIG. 7 depicts an exemplary implementation of a cloud computing architecture according to some embodiments of the present disclosure.
Figure 8:
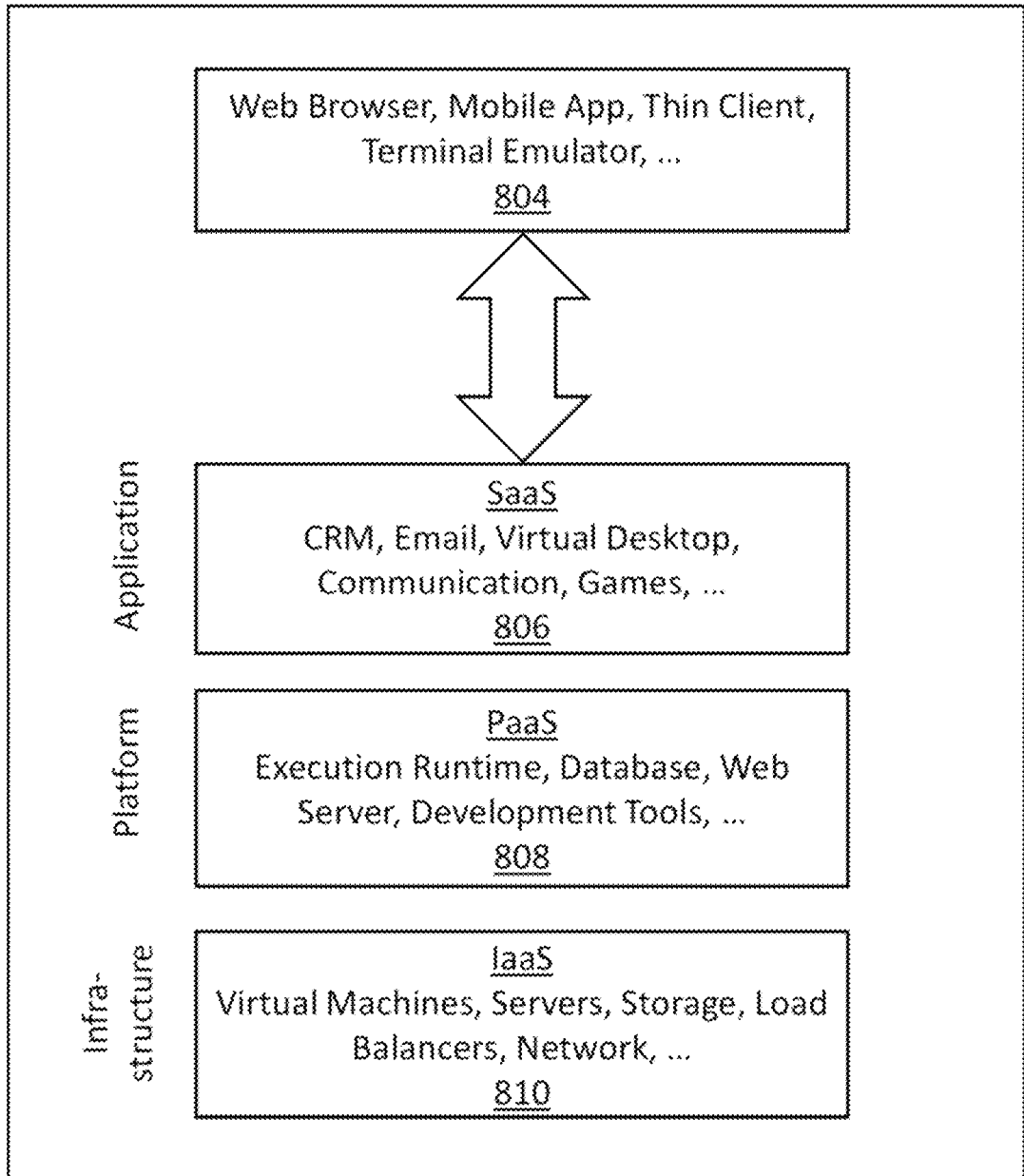
FIG. 8 depicts an exemplary implementation of a cloud computing architecture according to some embodiments of the present disclosure.

Turning to FIGS. 7 and 8, in some embodiments, the exemplary computer-based systems/platforms, the exemplary computer-based devices, and/or the exemplary computer-based components of the present disclosure may be specifically configured to operate in a cloud computing/architecture 108 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems for administrative customizations and control of network-hosted and/or blockchain-related APIs via a workflow service (and/or microservice) of a blockchain environment of the present disclosure may be specifically configured to operate.

Turning back to FIG. 1, according to some embodiments, database 110 may correspond to a data storage for a platform (e.g., a network hosted platform, such as cloud system 108, as discussed supra) or a plurality of platforms. Database 110 may receive storage instructions/requests from, for example, engine 200 (and associated microservices), which may be in any type of known or to be known format, such as, for example, standard query language (SQL).

According to some embodiments, database 110 may correspond to a distributed ledger of a distributed network. In some embodiments, the distributed network may include a plurality of distributed network nodes, where each distributed network node includes and/or corresponds to a computing device associated with at least one entity (e.g., the entity associated with cloud system 108, for example, discussed supra). In some embodiments, each distributed network node may include at least one distributed network data store configured to store distributed network-based data objects for the at least one entity. For example, database 110 may correspond to a blockchain, where the distributed network-based data objects can include, but are not limited to, account information, entity identifying information, wallet information, device information, network information, credentials, security information, permissions, identifiers, smart contracts, transaction history, and the like, or any other type of known or to be known data/metadata related to an entity's structure, business and/or legal demographics, inter alia.

In some embodiments, a blockchain may include one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, exemplary distributed blockchain-type ledger implementations of the present disclosure with associated devices may be configured to affect transactions involving Bitcoins and other cryptocurrencies into one another and also into (or between) so-called FIAT money or FIAT currency, and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

Data model engine 200, as discussed above and further below in more detail, can include components for the disclosed functionality. According to some embodiments, data model engine 200 may be a special purpose machine or processor, and can be hosted by a device on network 106, within cloud system 108 and/or on UE 900. In some embodiments, engine 200 may be hosted by a server and/or set of servers associated with cloud system 108.

According to some embodiments, as discussed in more detail below, data model engine 200 may be configured to implement and/or control a plurality of services and/or microservices, where each of the plurality of microservices are configured to execute a plurality of workflows associated with administering distributed network configurations defining a plurality of parameters associated with the plurality of distributed network data stores. Non-limiting embodiments of such workflows are provided below in relation to at least FIGS. 5 and 6.

According to some embodiments, as discussed above, data model engine 200 may function as an application provided by cloud system 108. In some embodiments, engine 200 may function as an application installed on a server(s), network location and/or other type of network resource associated with system 108. In some embodiments, engine 200 may function as application installed and/or executing on UE 900 and/or entity servers 102 and/or 104. In some embodiments, such application may be a web-based application accessed by UE 900 and/or servers 102-1-4 over network 106 from cloud system 108 (e.g., as indicated by the connection between network 106 and engine 200). In some embodiments, engine 200 may be configured and/or installed as an augmenting script, program or application (e.g., a plug-in or extension) to another application or program provided by cloud system 108 and/or executing on UE 900 and/or servers 102-104.

Figure 2:
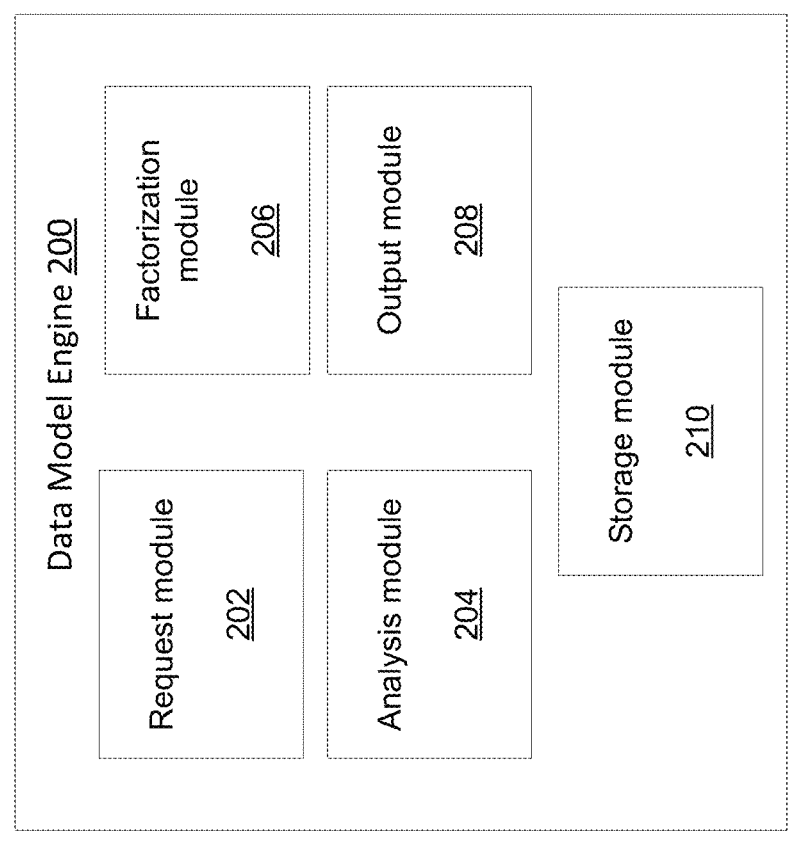
FIG. 2 is a block diagram illustrating components of an exemplary system according to some embodiments of the present disclosure.

As illustrated in FIG. 2, according to some embodiments, data model engine 200 includes request module 202, analysis module 204, factorization module 206, output module 208 and storage module 210. It should be understood that the engine(s) and modules discussed herein are non-exhaustive, as additional or fewer engines and/or modules (or submodules) may be applicable to the embodiments of the systems and methods discussed. More detail of the operations, configurations and functionalities of engine 200 and each of its modules, and their role within embodiments of the present disclosure will be discussed below in relation to FIGS. 3-6, inter alia.

Figure 3:
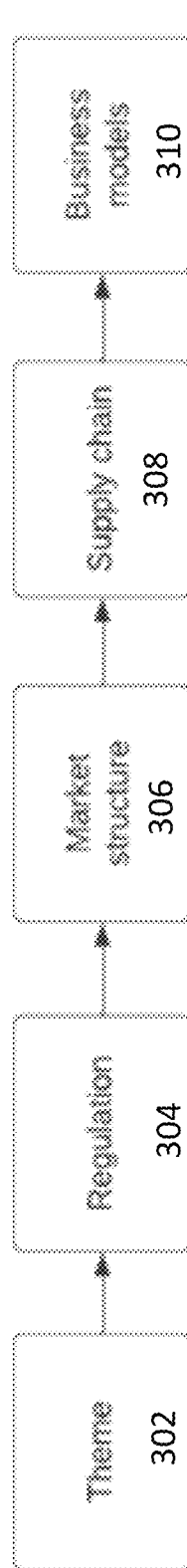
FIG. 3 illustrates an exemplary decision intelligence processing environment according to some embodiments of the present disclosure.

Turning to FIG. 3, provided is example configuration 300 of DI capabilities of engine 200, whereby a more detailed DI configuration 400 is discussed below in relation to FIG. 4. According to some embodiments, as discussed herein, DI configuration 300 enables a value chain for data financialization via scalable factorization of standardized data.

According to some embodiments, there can be two broad categories of data types: continuous data and discrete data. In some embodiments, continuous data and discrete data can be formatted, modified and/or configured as data entries corresponding to features and/or attributes (referred to as factors). In some embodiments, features correspond to unique information related to a particular data entry or relation (e.g., to other data, a source, a model, and the like). In some embodiments, attributes correspond to non-unique, groupable information of a particular data set.

In some embodiments, continuous data can be measurable, whereby values can be derived via division computations resulting in subdivisions of smaller data objects. For example, a data item can be modified so as to create two (2) data items by splitting them in half In some embodiments, continuous data can be formed into sequences, whereby a sequence can be configured as a data entry (or data structure).

In some embodiments, discrete data may be structurally and functionally different than continuous data. In some embodiments, discrete data may be static, and such data's values cannot be divided to create smaller subdivisions of data items. Discrete data can be countable and finite.

According to some embodiments, as discussed herein, events, which can be based on collected and/or generated data, can be modeled and represented as a data record. In some embodiments, an entity, as discussed above, can be a real-world object. In some embodiments, a record can be a set of information that describes an instance of an entity. In some embodiments, an event can be a collection of records describing an entity or entities. And, a model can be digital representation of one or many events.

Moreover, according to some embodiments, models can be events of a set of records produced via electronic interactions between entities (e.g., electronic interactions via network 106 between entity server 102 and entity server 104). As discussed herein, a model (e.g., business model 310 as discussed below) can be defined based on the interacting entities, the records being used, transacted and/or created, and the events being characterized. Models can be qualitative, quantitative, or some combination thereof, and can represent relationships among entities for a business. For example, if a business is the diamond business, then the entities for the diamond modelling can be, but are not limited to, a supplier(s), partner(s), customer(s) and competitor(s), and the events created correspond to the records produced from a diamond transaction(s).

Turning to DI configuration 300 of FIG. 3, depicted are components that include, but are not limited to, theme 302, regulation 304, market structure 306, supply chain 308 and business model(s) 310. DI configuration 300 provides a non-limiting example of the components involved in the value chain for performing the disclosed scalable factorization of data, as discussed herein.

In some embodiments, theme 302 provides thematic factors that provide a scope of engagement for a business and/or industry. For example, from the above example, a theme 302 can indicate operations of a diamond industry (which can be global, or geographical, for example). In another non-limiting example, a theme 302 can provide a factor effecting an industry (or industries)—for example, the COVID-19 pandemic.

In some embodiments, regulation 304 corresponds to regulatory frameworks that dictate the boundaries of operation of an entity. For example, this can range from by-laws of a company to legislation enacted by a government. In some embodiments, the factors of theme 302 and regulation 304 can correspond to events that impact an entity and its transactional operations.

In some embodiments, market structure 306 corresponds to the relationships between entities operating within a business. For example, from the above example, the market structure 306 of the diamond business can involve the connections between the supplier, partner, customer and competitor, and the integration of their activities that impacts their transactions among each other.

In some embodiments, supply chain 308 corresponds to how the market structure 306 operates. This can be a tangible, structural development adhered to by each entity in the market structure 306. For example, supply chain 308 can coordinate how each entity in the market structure 306 of the diamond business operates (with acknowledgment and deference to the theme 302 and regulation 304, as discussed below).

And, in some embodiments, as discussed above, business models 310 provide, impact and/or collect data related to the scope and behavior of each entity operating within the market structure 306 via the supply chain 308. According to some embodiments, the business models 310 enable and/or provide the creation of data, data structures and/or data models of recorded events between entities based on their operations according to the applied/observed theme 302, applied regulation 304, within the market structure 306, and via the supply chain 308.

Figure 4:
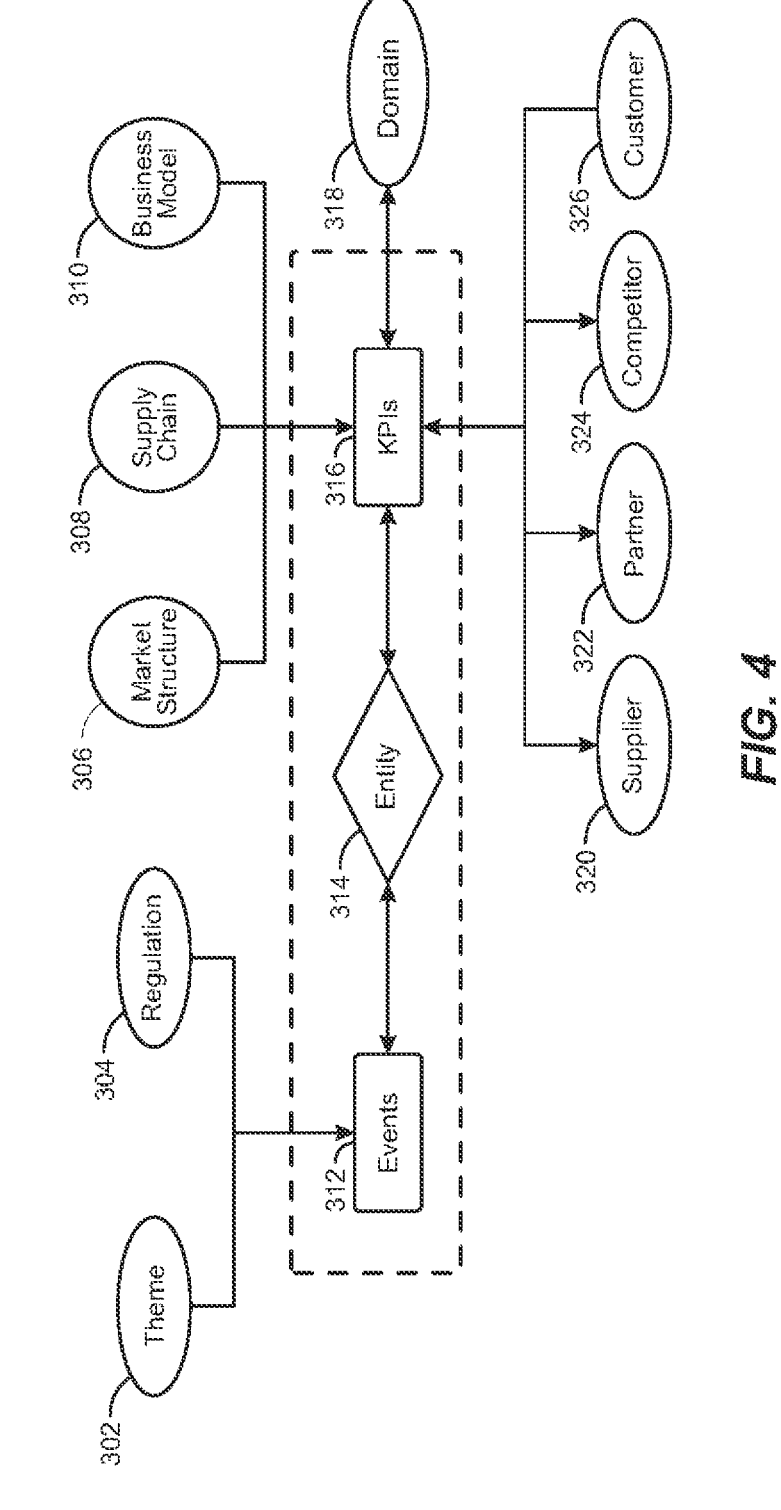
FIG. 4 illustrates an exemplary decision intelligence processing environment according to some embodiments of the present disclosure.

Turning to FIG. 4, DI configuration 400 is provided which provides further details of the DI factorization of data discussed herein. In some embodiments, configuration 400 includes, but is not limited to, the components from DI configuration 300, events 312, entity 314, key performance indicators (KPIs) 316, domain 318, supplier, 320, partner 322, competitor 324 and customer 326. As above, the implementation of DI configuration 400 and components included therein (e.g., items 302-326) should not be construed as limiting.

According to some embodiments, the disclosed framework can determine KPIs 316 for an entity 314 based on factors associated with, but not limited to, the market structure 306, supply chain 308 and business model 310. In some embodiments, as depicted in FIG. 4, the KPIs 316 can also be impacted based on operations of the entity 314, which can be based on events 312 occurring via factors of theme 302 and regulation 304, as discussed above. In some embodiments, the KPIs can also or alternatively be impacted by information provided by and/or associated with domain 318, which can correspond to the entity 314 and/or any other entity within DI configuration 400. In some embodiments, KPIs 316 can also be benchmarked (or based on) via factors of relevant entities (e.g., entities associated with the entity 314—for example, competitors, relationship partners, subsidiaries, affiliates, employees, and the like, or some combination thereof). For example, as depicted in FIG. 4, entity 314 can operate in the diamond business, therefore, factors of supplier 320, partner 322, competitor 324 and customer 326 can impact the KPIs 316 of entity 314. Further discussion of the utilization and implementation of DI configurations 300 and 400 are provided below with reference to FIGS. 5-6.

FIG. 5 provides Process 500 which details non-limiting example embodiments for the creation, management and trading of machine-readable data in exchange for value. According to some embodiments, Step 502 of Process 500 can be performed by request module 202 of data model engine 200; Steps 504-508 can be performed by analysis module 204; Steps 510-512 can be performed by factorization module 206; Steps 514-516 can be performed by output module 208; and Steps 518-520 can be performed by storage module 210.

In some embodiments, Process 500 provides example embodiments for the generation of machine-readable data (e.g., as containerized data associated with and/or corresponding to a data structure of a created data model). As discussed in more detail below, the disclosed framework can factorize data based on, but not limited to, data infrastructure standardization and/or DI monetization determinations/considerations.

In some embodiments, data infrastructure standardization can include, and/or be based on, governance, policy and access information. Such information, for example, can be effectuated via global grid monitor (GGM) functionality provided by engine 200. According to some embodiments, GGM can involve the application of Data Sensitivity Tagging (DST) processing, whereby any Data Terms and Compliance (DTC) information can be attached to data being processed (e.g., modelled, collected, ingested and/or stored). Thus, GGM functionality can enable engine 200 (and, therefore, cloud system 108) to control access to and audit any transformation of the data and environments where such data can and/or will be used. Indeed, GGM enables the implementation of jurisdictionally compliant privacy, governance and access control policies.

In some embodiments, data infrastructure standardization can also include, and/or be based on, distribution computation, storage and custody information. Such information can correspond to, but is not limited to, blockchain based infrastructure information that correlates to regulatory information and protections that can mirror and/or enhance currently applied security protocols (e.g., encryptions and/or data privacy protocols associated with how certain types of data can be processed).

In some embodiments, DI monetization, as discussed herein, can correspond to event driven analytics, path and price predictions for data, and the like. As discussed herein, engine 200 can correlate data to events and entities, thereby providing a structured data object that can be leveraged to impact computed measurements related to analysis and decision operations for an entity.

Accordingly, as discussed below, the disclosed factorization framework can enable functional implementation and/or usage from both a know your customer (KYC) and a know your data (KYD) perspective. In some embodiments, KYC can involve the establishment of user identity, determination of the user's activities, verification of their legitimacy, and the like. KYC can provide a functional backbone for the disclosed framework from successful compliance and risk management perspectives. In some embodiments, KYD can involve legal and compliance infrastructures via GGM functionality, associated with entities and associated events, as well as qualitive measurements of event validation and data generation. By way of example, raw data can be identified, whereby it can be GGM tagged data, then labelled, and output as an intelligent data model structure that is in compliance with the policies, configurations and regulations associated with KYC and KYD analysis. As a result, the disclosed framework enables a know your business (KYB) output that can be provided via the intelligent data model structure, as discussed below.

According to some embodiments, Process 500 begins with Step 502 where engine 200 receives a request from a user to generate a model based on a set of data. As discussed above, the user can be associated with UE 900, entity server 102 and/or entity server 104 from FIG. 1. The user can be, but it not limited to, a company, consumer, entertainment stream, and the like, or some combination thereof. In some embodiments, the request for the data modelling performed via Process 500 can be a result of a smart contract, whereby access to specific forms of data on a blockchain (e.g., database 110) may be granted via the smart contract.

In some embodiments, the request of Step 502 can include, reference and/or identify a specific type and/or quantity of data. In some embodiments, the request can include a pointer to a network resource (via a uniform resource identifier (URI), for example) where the identified data set can be located and retrieved/extracted. In some embodiments, the data set can be proprietary to the requesting user, to a third party on the network, to another user, and the like, or some combination thereof. In some embodiments, the request can also request types of modelling to be performed. For example, the request can inquire about ROI of specific types of advertisements for a specific time period, and the click-through-rate (CTR) of each advertisement from specific domains. In some embodiments, the request can further request a type of DI analysis—for example, request a deep belief analysis. In some embodiments, the request may also specifically request and/or identify a type of requested output (e.g., a graph, simulation, interface, image, multimedia, text, and the like). In some embodiments, the request may further identify and/or include information related to particular regulation, policies and compliance programs, as discussed above.

In some embodiments, the request of Step 502 may be accompanied by and/or associated with a transaction for data. In some embodiments, a pricing structure and/required payment may be associated with a request, which can be based on, but not limited to, a type of request, type of data, type of requestor, type of source of data, type of transaction, type of DI, type of theme, type of regulation, type of output, type of payment (e.g., Bitcoin, FIAT, and the like), and the like, and/or some combination thereof. According, in some embodiments, Step 502 may involve engine 200 receiving payment, and confirming its acceptance according to terms of a smart contract before proceeding to the subsequent steps of Process 500.

In some embodiments, Step 502 may also include and/or be associated with GGM information, that engine 200 can utilize to determine if the requesting user is capable (e.g., approved) to view and/or access the data identified in the request. In some embodiments, therefore, engine 200 can analyze the request and identify its included/associated GGM information, and compare it to the GGM of the data, and upon the request being in compliance with the polies of the data, the processing of Process 500 can continue/proceed.

In Step 504, engine 200 can identify the data (e.g., extract from the request, and/or collect from a network location), and perform a computational analysis therefrom. In some embodiments, the analysis performed by engine 200 can include any type of known or to be known AI/ML classifier and/or computational analysis that enables mining of information from electronic data objects (e.g., the request), for example, but not limited to, neural network analysis, data mining, random forest, logistic regression, feature vector analysis, Markov modelling, stochastic decision trees, and the like.

In some embodiments, Step 504 can involve engine 200 parsing the request, and determining, detecting, extracting or otherwise identifying the electronic information related to the set of data from the parsed data. In some embodiments, the computational analysis discussed above can be performed on the parsed data.

As a result of the above analysis, engine 200 can determine a format of the set of data. The format can include information related to, but not limited to, format type, source, location, size, protocols (e.g., security features applied), and the like. In some embodiments, the determination can involve determining whether the data is in a raw format. In some embodiments, if the data is not in a native or raw format, engine 200 can modify the data, via a deep learning model (for example), to a raw, web-agnostic format.

In Step 506, engine 200 can determine the factorization features of the set of data. The features can correspond to information related to the components of DI configurations 300-400. For example, the features can be the factors of components 302-326. In another example, the features can correspond to GGM policies to apply to the data (e.g., policies associated with, for example, demographics, data privacy, geographics, and the like).

In some embodiments, Step 506 can involve the annotation or augmentation of the set of data. In some embodiments, such annotation/augmentation can involve tagging the set of data (e.g., each data item in the set, and/or the set as a whole) with tags that modify the data to indicate the factorization features. For example, the metadata associated with the data can be modified via the tagging.

For example, a set of data can be tagged with specific GGM. For example, if the data corresponds to electronic health records (EHS), then the data can be tagged with HIPAA tags that can control how the data can be access, managed, stored, manipulated and transferred.

In Step 508, engine 200 can identify and access a set of APIs based on the factorization features. The APIs can be provided by engine 200, and/or be hosted by cloud system 108. The APIs enable the DI modelling, which as discussed herein, can enabling the creation of the computer-readable, non-fungible data (and tokens) that the framework creates, manages, and hosts. According to some embodiments, the APIs can correspond to specific types of data, and/or specific types of computations. For example, if CTR statistics are being requested for an advertisement campaign, a specific API may be called; whereas if big data is being accessed, a hierarchical API may be called to configure such volume of data.

In Step 510, engine 200 can perform the requested modelling via execution of the computational analysis and classification enabled via the accessed set of APIs (from Step 508). According to some embodiments, Step 510 can involve engine 200 processing the raw, tagged data by performing factorization of the raw data via the identified DI APIs. According to some embodiments, engine 200 can input the raw, tagged data, whereby the APIs can process the data via their inherent/included functionality in accordance with the policies provided by the tags.

In some embodiments, Step 510 can involve engine 200 creating a new data. The new data can be in a form of a data model data structure, that provides, inter alia, statistics, metadata, and/or values/metrics that indicate a result of the modelling. In some embodiments, the data can be formatted in any type of known or to be known format including, but not limited to, a feature vector, object, item, file, data structure, executable file/extension and/or container of data. In some embodiments, the data can be configured as any type of data model, including, for example, a relational, dimensional, entity-relationship, hierarchical, network, object-orientated, physical, logical, multi-value, conceptual and the like.

In Step 512, as a result of the modelling in Step 510, engine 200 can generate a labelled data model for the set of data. In some embodiments, the labelled data model is the generated data model from Step 510, whereby it is modified to be associated with an applied label(s). In some embodiments, the label can provide an indication of KYC and/or KYD processing performed, as discussed above. In some embodiments, the label can provide an indication as to the type of processing performed, the type of data analysis and/or the type of data used for the processing/analysis. In some embodiments, the label can correspond to, but is not limited to, GGM tagging, type of request, user identifier (ID), type of source entity, type of entity for which data is related, type of analysis, and the like, or some combination thereof.

In Step 514, the labeled data model can be output by engine 200. In some embodiments, such output can include, but is not limited to, sending to a requesting user, displaying on a user interface (UI), sharing over a network to a network location, posting to a website, sending to an administrator, and the like, or some combination thereof. In some embodiments, Step 514 can involve the transformation of the data model to a visual output, which can be displayed on a display of a device of the user (e.g., UE 900 displaying a UI with a statistical display of the modelled data, for example). In some embodiments, the model can be output as any type of computer-readable and/or displayable file type, including, but not limited to, a UI, message, electronic document, web page, augmented reality (AR) display, virtual reality (VR) display, extended reality (XR) display, within a metaverse platform, and the like, or some combination thereof.

For example, a UI can be displayed on a web page, where an interactive interface object (IO) is depicted that represents a data model. Upon interaction with the IO (e.g., selecting), the data model can be retrieved and compiled in a manner as requested by the user, or in a manner that deterministically provides concepts and understandings of the modelled data, and the modelling that was performed to create the data.

In Step 516, engine 200 can create a token(s) associated with the generated data model. In some embodiments, Steps 514 and 516 can be performed; and in some embodiments, Step 514 or Step 516 can be performed.

In some embodiments, the token can be a custom generated token that enables the regulation and tracking of usage, as discussed below (e.g., pay-as-you-go, for example). In some embodiments, the token can enable access to the created data model. In some embodiments, the token can be any type of known or to be known cryptographic token, for example, an non-fungible token (NFT) that represents the data model generated and labeled, as above. In some embodiments, the token can have associated therewith a time-decay function that limits the length of usage of the token. In some embodiments, the token can be restricted to a specific and/or class of users. In some embodiments, the token may be further restricted, based on, but not limited to, user demographics, geography, IP address, and the like.

In some embodiments, Step 516 can involve engine 200 creating a smart contract, whereby upon a user accessing the token (e.g., Step 518 below), the user is bound to the terms of the smart contract which define the terms of use of the token and/or its associated data model (e.g., which users can access the token, types of computations based on the data model, where the data model can be accessed from, a time limit for such access, and the like). Further, the smart contract may also govern and/or define the price for access and/or usage to the token's associated data model.

In some embodiments, additional tokens may be created, which can govern how other users (as discussed below in relation to FIG. 6) can access, view and/or manipulate/modify the data model. Such token generation and application can be performed in a similar manner as discussed herein.

In Step 518, engine 200 can securely provide the token to the requesting user. In some embodiments, the token can be sent and stored in a wallet(s) associated with the requesting user.

In some embodiments, in order for the user to submit the request (from Step 502), the user must be validated. Accordingly, in some embodiments, engine 200 can institute an identity verification step that verifies the user's identity prior to the user engaging the platform. In some embodiments, such verification protocol can involve, but is not limited to, a username, password, PIN, alphanumeric code, biometrics, facial recognition, voice recognition, two-factor authorization, virtual card software (e.g., Lithic™) and the like, and/or any other type of known or to be known verification mechanism.

Thus, in some embodiments, upon verifying the user's identity, engine 200 can utilize an ID of the user to locate a wallet(s) on the network for storage of the generated token.

In Step 520, engine 200 can store the created model in a data storage. In some embodiments, such storage can involve writing the data model to at least one block on the blockchain. Execution of the writing can be performed according to any known or to be known mechanism for updating a blockchain.

Figure 6:
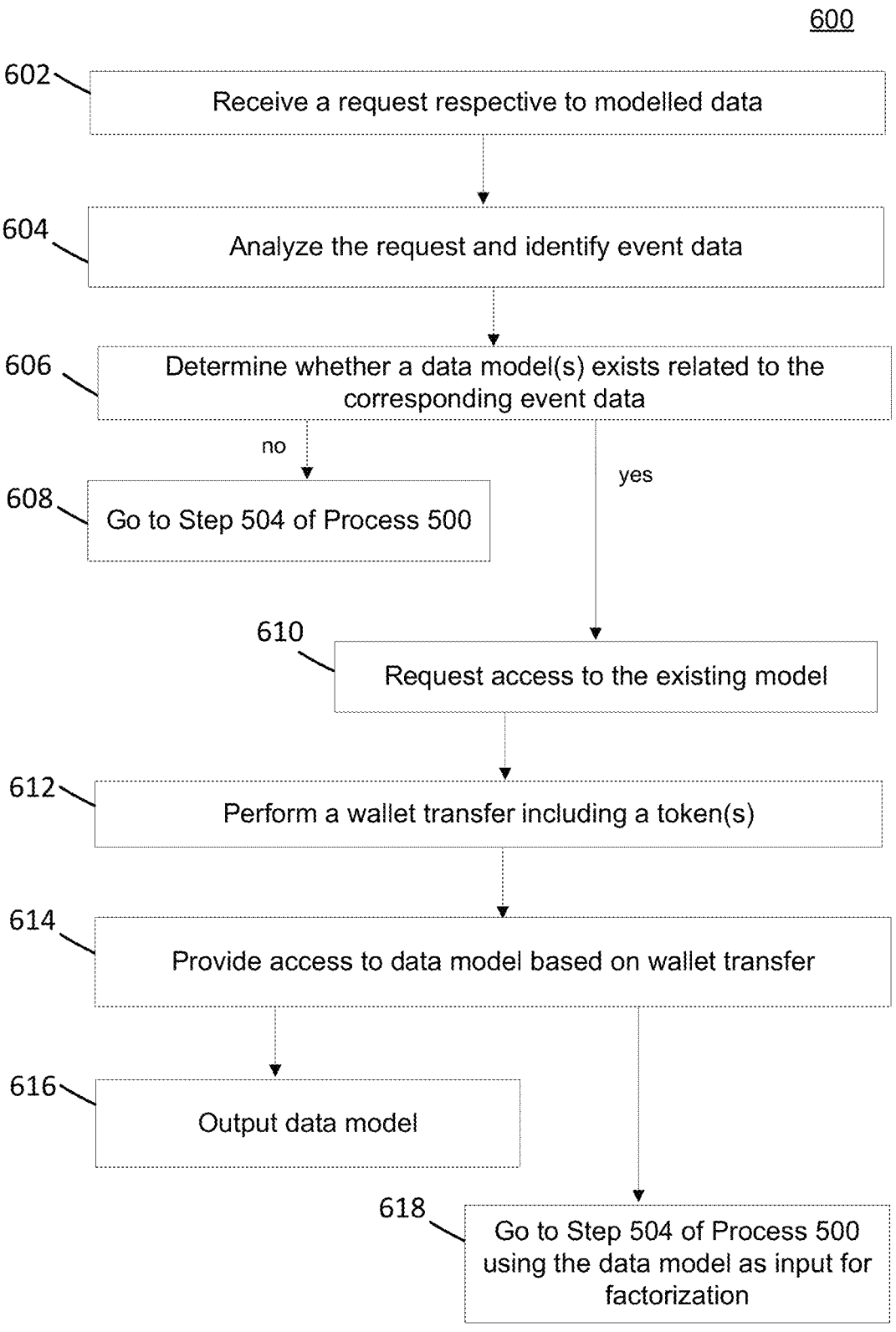
FIG. 6 illustrates an exemplary data flow according to some embodiments of the present disclosure.

In FIG. 6, Process 600 provides a non-limiting example embodiment for transfer, sharing and/or monetization of a created data model via the disclosed framework. According to some embodiments, Steps 602 and 610 of Process 600 can be performed by request module 202 of data model engine 200; Steps 604, 608 and 618 can be performed by analysis module 204; Step 606 can be performed by factorization module 206; Step 612 can be performed by storage module 210; and Steps 614-616 can be performed by output module 208.

In some embodiments, Process 600 enables and/or involves the tracking of data transactions via the tokens of created data models, whereby access, usage and/or modification or hosting of a data model can be monetized, which can be based on, but not limited to, a type of access/use, time frame for use, and/or location of use, among other factors. For example, a user with approved access can receive a copy of a created data model in exchange for value (e.g., a provided monetary sum, in any format). As such, via the value chain provided by engine 200, an intelligent data delivery can be traced through a factorization that involves KYC and KYD entity analysis. In some embodiments, in order to price the data, a client can integrate and/or connect their data and/or platform to the platform provided by/associated with engine 200 via custom-generated tokens that regulate and track the intelligent data usage through consumption based strategy at cost-plus (e.g., pay-as-you-go pricing models, for example).

In some embodiments, users (e.g., customers of system 108 for example) may engage directly with their customers using the intelligent data they produced via the platform provided by engine 200. In some embodiments, as provided below, this can involve a request for an appropriate token that enables them to perform the necessary decisions they have identified (e.g., from a search or from perspective modelling performed via Process 500). In some embodiments, particular tokens can be generated that enable access, enable types of modifications, enabling hosting and/or enable sharing of data, and these can be determined and/or assigned to entities/users based on their category of business, class, and/or operational status, as well as their needs. In some embodiments, types of tokens can have different price points, which can cause particular tokens to cost more, cause tokens to be geo-fenced, and/or have a time decay value that renders them unusable after a certain period of time (e.g., as the data may become obsolete after a certain period of time.

In some embodiments, as evident from the discussion below, the disclosed framework, via engine 200's operations, can integrate a transparent and proprietary pricing structure that can be based on the value chain (e.g., DI 400, for example). According to some embodiments, given an entity relationship, records and events associated therewith, in addition to DST and DTC and the type of models being used to produce the intelligent data that the user is using on their platform, customized and/or personalized pricing structures can be formulated and applied in the form of tokens that can dictate and/or control access to the data. In some embodiments, a complete linkage between an entity and engine 200 can be created from the client-side point of transaction, which can be traced by a token (e.g., a proprietary token, as discussed above) through the intelligent, labeled and tagged data, all the way back to the raw data format of the data.

Accordingly, according to some embodiments, cloud system 108 can provide platform functionality that can capture an entire value chain of data generation, transformation, distribution and retail via engine 200's functionality that clients can engage with via pricing structures that enable automatic payments/charges to be executed through associated tokens; therefore, system 108 can create a new level of transactional transparency and a new type of data market for created data models (that does not currently exist). Thus, as discussed herein, the disclosed framework provides a novel type of custodian-based platform that enables a transparent market structure for a new type of asset (e.g., data and the created and stored data models) to be bought, shared, traded, and the like, via a blockchain-backed system.

In some embodiments, Step 600 begins with Step 602 where engine 200 receives a request from a user respective to a set of modelled data. According to some embodiments, the request can identify a type of data, quantity of data, source of data, and the like. In some embodiments, the request can further or alternatively include information related to, but not limited to, a type of payment, price structure, token, GGM, user ID, set of data, a data model(s), smart contract, and the like, or some combination thereof. In some embodiments, Step 602 can include similar types of information from the request discussed above in relation to Step 502 of Process 500.

For example, Step 602 can originate from a user of entity 102 for a data model created by entity 104, where entity 102 and entity 104 each have business operations at least with overlapping contexts.

In some embodiments, Step 602 can further involve determining whether the request is permitted. That is, as discussed above, engine 200 can analyze the request, and determine whether the appropriate/required information accompanies and/or is included in the request, such as, but not limited to, required payment, payment type (e.g., FIAT or Bitcoin, for example), GGM information, location, time-period, token and the like, or some combination thereof. For example, engine 200 can determine whether the request for the data model is in compliance with the smart contract created for such model (as discussed above). If not, engine 200 can deny the request, and/or request additional information.

In Step 604, engine 200 can analyze the request, and identify event data. As discussed above, the event data can correspond to factors of a theme, regulation and/or other types of entities related to the user. In some embodiments, the event data can correspond to the information included in and/or associated with the request, as discussed supra.

In Step 606, engine 200 can determine whether the model requested exists already in data storage (e.g., database 110, for example, a blockchain). In some embodiments, engine 200 can determine whether the model, if found, has been created within a predetermined time period so as to ensure that the data modelling is current and provides viable information. For example, if the model was created two (2) years ago, then its analysis may not be current and/or have value that correlates to the user's request.

In some embodiments, engine 200 can execute Step 606 by performing/executing a search of database 110 (e.g., the distributed ledger or blockchain) to determine whether the model exists. For example, engine 200 can parse the blockchain and identify the associated blocks where the model was previously written. In some embodiments, engine 200 can perform a similarity analysis against a similarity threshold in order to determine whether the model's data is at least a threshold satisfying value of similarity to the event data. In some embodiments, engine 200 can execute any type of known or to be known ML/AI classifier for performing such similarity analysis.

In some embodiments, should the model not be located, or the model be located but be determined to not be current (e.g., outside the predetermined period of time), as discussed above, then Process 600 can proceed to Step 608, where engine 200 can begin the processing of a new model according to the steps of Process 500 of FIG. 5, beginning with Step 504.

In some embodiments, should a model be located, engine 200 can request access to the existing model, as in Step 610. In some embodiments, such access request can comprise, but it not limited to, a token, user ID (or other verification information/data), payment (if not already provided), and/or any other type of information for accessing a securely held data model/resource.

In some embodiments, the access request may also and/or alternatively be sent to the user associated with the model's creation (e.g., the user providing the request from Step 502 of Process 500 of FIG. 5). In some embodiments, such user(s) may be required to sign-off/approve the access. Accordingly, in some embodiments, how the access request of Step 610 is processed can be based on a smart contract associated with the data model.

In some embodiments, should the request be denied in some manner (e.g., the requesting user is not in compliance with the GGM or other feature of a smart contract, or the generating user denies the request, and the like), processing of Process 600 can proceed to Step 608, as discussed above.

In Step 612, whereby an approved access is provided, engine 200 can receive tokens for the access to the data model. In some embodiments, Step 612 can involve a wallet transfer, whereby such transfer can be, but is not limited to, wallet to wallet, or blockchain to wallet. In some embodiments, the requesting user of Step 602 can receive the token an associated wallet from, but not limited to, the wallet of the originating user (from Step 502), a wallet associated with system 108, a wallet associated an entity, and the like, or some combination thereof.

In Step 612, upon receiving a copy of the data model, which can be in any type of format, as discussed above, engine 200 can process the data model according to the request (from Step 602). Such processing can be in compliance with the factors, restrictions and/or policies of the data model, token and/or smart contract, and/or the requested processing from the request of Step 602. Accordingly, in some embodiments, Step 612 can involve engine 200 determining a type of processing to be performed.

In some embodiments, when the processing is determined to output the model for viewing, then Process 600 can proceed from Step 614 to Step 616 where the data model is output, which can be performed in a similar manner as discussed above at least in relation to Step 514 of Process 500.

In some embodiments, when the processing is determined to generate a new model based on the existing data model, engine 200 can proceed to Step 618 whereby engine 200 can execute the steps of Process 500 of FIG. 5, beginning with Step 504, with the data model and/or its associated data/metadata as the input.

In some embodiments, engine 200 can perform the processing according to Steps 616 and/or 618, whereby in some embodiments, both visual display of the existing data model and the re-processing of a new data model (or new version of the model) can be performed.

By way of a non-limiting example, as provided via the steps of Processes 500-600, user Janet, who is a General Manager (GM) of a professional football team in New York, is interested in understanding fan loyalty in the New York City region. Janet logins into the disclosed platform, and submits a request, as discussed above. According to some embodiments, Janet can readily create fan archetypes as entities for the New York City region that are filtered by information that they deem relevant to their professional football team. This can be performed via the processing discussed above in relation to Process 500 of FIG. 5. As a result, a value chain is initiated, where all relevant data tagging level is identified and data labels are assigned relationships to the entity archetype that Janet is creating. Thus, upon completion of the data modelling requested by Janet, Janet can now gain a deep understanding of the archetype that was constructed through KYC and KYD based on DI predictive analytics. Janet created intelligent data that has been tokenized on the blockchain; therefore, each time Janet transacts with this data, the token can be validated to ensure proper access and validity of the DI being performed.

Continuing with the example, when Robert, the GM of a soccer team in New York, wants to understand their team's fan base, they can seamlessly interact with relevant blocks of the chain that Janet created. This is provided for via Process 600 of FIG. 6. According to some embodiments, transactions can immediately float from wallet to wallet using token validation with engine 200 serving as the settler. That is, in some embodiments, Robert can pay for access to Janet's data, where such payment can be priced and/or structured according to, but not limited to, the type of access, timing of the access, geography of the access, and the like, or some combination thereof. In some embodiments, as discussed above, Robert can remit payment to Janet, to system 108, and/or any other entity on the network responsible for enabling the transaction, and/or some combination thereof.

As such, as evidenced by the above disclosure, as the information stack financializes, data asset owners can have the ability to develop and leverage cash flow businesses on the data they create in their businesses through the disclosed platform in order to generate intelligent data that supports their decision-making. Thus, the disclosed platform effectively can operate as a data custodian bank that provides a market place to create and transact data. The disclosed data factorization techniques and technology provide novel monetization mechanisms that enable the liquidity and access to previously controlled data.

Figure 9:
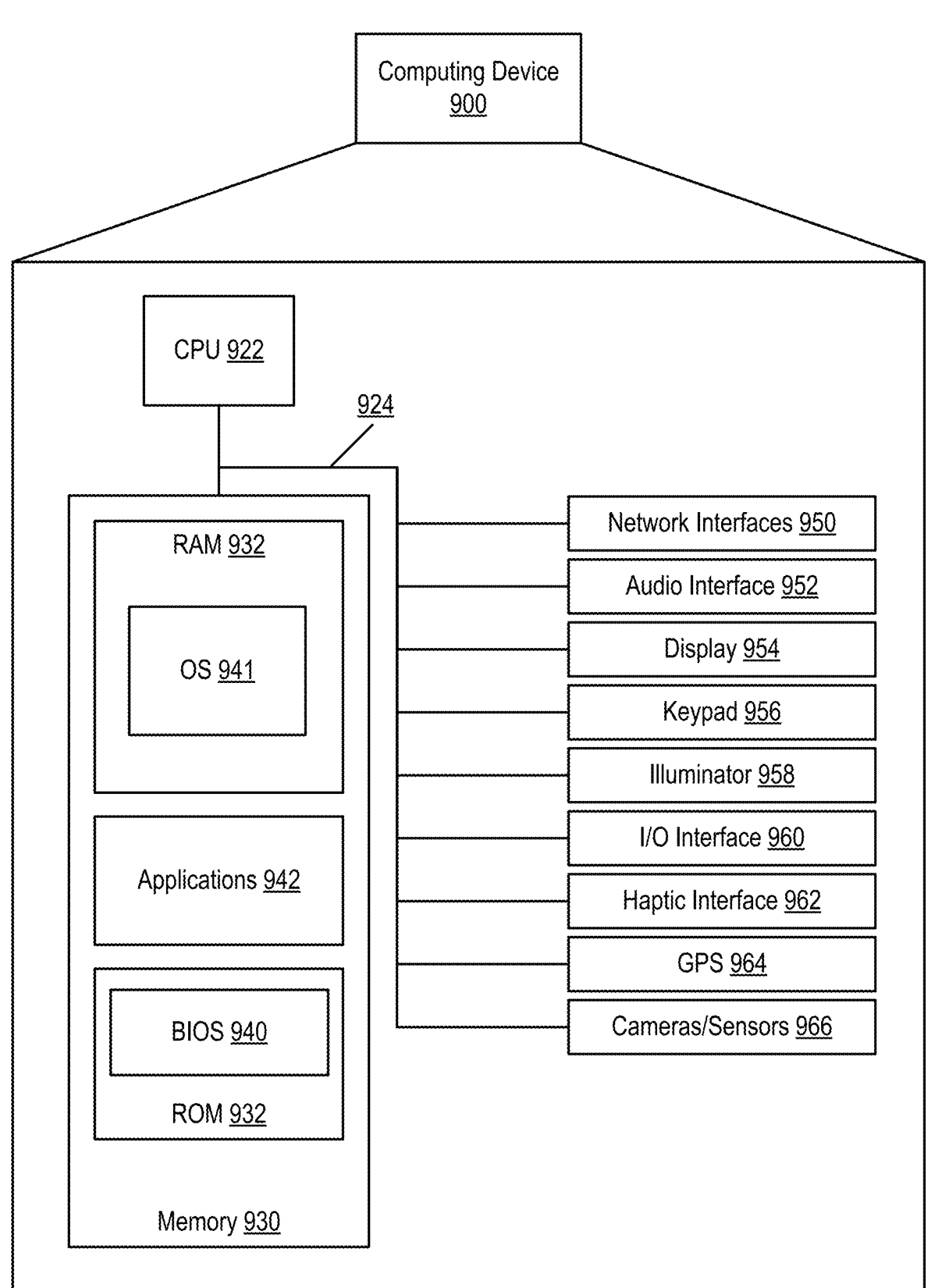
FIG. 9 is a block diagram illustrating a computing device showing an example of a client or server device used in various embodiments of the present disclosure.

FIG. 9 is a schematic diagram illustrating a client device showing an example embodiment of a client device that may be used within the present disclosure. Client device 900 may include many more or less components than those shown in FIG. 9. However, the components shown are sufficient to disclose an illustrative embodiment for implementing the present disclosure. Client device 900 may represent, for example, UE 900 discussed above at least in relation to FIG. 1.

As shown in the figure, in some embodiments, Client device 900 includes a processing unit (CPU) 922 in communication with a mass memory 930 via a bus 924. Client device 900 also includes a power supply 926, one or more network interfaces 950, an audio interface 952, a display 954, a keypad 956, an illuminator 958, an input/output interface 960, a haptic interface 962, an optional global positioning systems (GPS) receiver 964 and a camera(s) or other optical, thermal or electromagnetic sensors 966. Device 900 can include one camera/sensor 966, or a plurality of cameras/sensors 966, as understood by those of skill in the art. Power supply 926 provides power to Client device 900.

Client device 900 may optionally communicate with a base station (not shown), or directly with another computing device. In some embodiments, network interface 950 is sometimes known as a transceiver, transceiving device, or network interface card (NIC).

Audio interface 952 is arranged to produce and receive audio signals such as the sound of a human voice in some embodiments. Display 954 may be a liquid crystal display (LCD), gas plasma, light emitting diode (LED), or any other type of display used with a computing device. Display 954 may also include a touch sensitive screen arranged to receive input from an object such as a stylus or a digit from a human hand.

Keypad 956 may include any input device arranged to receive input from a user. Illuminator 958 may provide a status indication and/or provide light.

Client device 900 also includes input/output interface 960 for communicating with external. Input/output interface 960 can utilize one or more communication technologies, such as USB, infrared, Bluetooth™, or the like in some embodiments. Haptic interface 962 is arranged to provide tactile feedback to a user of the client device.

Optional GPS transceiver 964 can determine the physical coordinates of Client device 900 on the surface of the Earth, which typically outputs a location as latitude and longitude values. GPS transceiver 964 can also employ other geo-positioning mechanisms, including, but not limited to, tri-angulation, assisted GPS (AGPS), E-OTD, CI, SAI, ETA, BSS or the like, to further determine the physical location of Client device 900 on the surface of the Earth. In one embodiment, however, Client device may through other components, provide other information that may be employed to determine a physical location of the device, including for example, a MAC address, Internet Protocol (IP) address, or the like.

Mass memory 930 includes a RAM 932, a ROM 934, and other storage means. Mass memory 930 illustrates another example of computer storage media for storage of information such as computer readable instructions, data structures, program modules or other data. Mass memory 930 stores a basic input/output system ("BIOS") 940 for controlling low-level operation of Client device 900. The mass memory also stores an operating system 941 for controlling the operation of Client device 900.

Memory 930 further includes one or more data stores, which can be utilized by Client device 900 to store, among other things, applications 942 and/or other information or data. For example, data stores may be employed to store information that describes various capabilities of Client device 900. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 900.

Applications 942 may include computer executable instructions which, when executed by Client device 900, transmit, receive, and/or otherwise process audio, video, images, and enable telecommunication with a server and/or another user of another client device. Applications 942 may further include a client 945 that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hard-ware components (such as the libraries, software develop-ment kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), pro-grammable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible proces-sors, multi-core, or any other microprocessor or central processing unit (CPU). In various implementations, the one or more processors may be dual-core processor(s), dual-core mobile processor(s), and so forth.

Computer-related systems, computer systems, and sys-tems, as used herein, include any combination of hardware and software. Examples of software may include software components, programs, applications, operating system soft-ware, middleware, firmware, software modules, routines, subroutines, functions, methods, procedures, software inter-faces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Soft-ware components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically pro-grammed in accordance with one or more principles of the present disclosure may be downloadable from a network, for example, a web site, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be under-stood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an auto-mated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising;

receiving, by a device, over a network, a request from a user, the request comprising information related to the user, the request further comprising information associated with a set of data;

determining, by the device, based on analysis of the set of data information, a format of the data;

determining, by the device, factorization features of the set of data;

determining, by the device, global grid monitor (GGM) tagging for the set of data, the GGM tagging comprising data sensitivity tagging (DST) information and data terms and compliance (DTC) information attached to the set of data;

accessing, by the device, a set of application program interfaces (APIs), the set of APIs providing executable functionality for executing decision intelligence (DI) software;

performing, by the device, modelling of the set of data in accordance with the user request, the modelling comprising inputting the set of data into each of the set of APIs;

generating, by the device, a labelled data model, the labelled data model being a comprehensive analytical data structure based on the set of data and comprising information indicating at least one label and tag, the label corresponding to a context of the data model, the tag corresponding to at least one policy controlling the set of data, the tag controlling access to and audits transformation of the set of data and environments where the set of data is used, the tag comprising jurisdictionally compliant privacy, governance and access control policies based on the GGM tagging; and executing, by the device, the labelled data model in accordance with a smart contract, the smart contract comprising a structure that corresponds to types of usage of the labelled data model.

2. The method of claim 1, further comprising:

outputting, over the network, for display, a user interface (UI), the UI providing a visual display of the analysis performed in the modelling of the set of data.

3. The method of claim 1, further comprising:

generating at least one token, the at least one token enabling access to the stored labelled data model; and providing the at least one token to the user, the provided token being stored in a wallet of the user.

4. The method of claim 3, wherein the smart contract further comprises information related to access and types of usage of the at least one token.

5. The method of claim 1, wherein the smart contract further comprises permissions for enabling modification to the labelled data model.

6. The method of claim 1, further comprising:

storing, over a network, the labelled data model in data storage.

7. The method of claim 6, wherein the data storage is an associated blockchain.

8. The method of claim 1, further comprising:

receiving a request from a second user for the data model;

analyzing the request, and determining that the request is approved, the determination being based on the smart contract;

providing a token to the second user, the token being provided via a wallet transfer; and providing access to the data model based on the token.

9. A device comprising:

a processor configured to:

receive, over a network, a request from a user, the request comprising information related to the user, the request further comprising information associated with a set of data;

determine, based on analysis of the set of data information, a format of the data;

determine factorization features of the set of data;

determine global grid monitor (GGM) tagging for the set of data, the GGM tagging comprising data sensitivity tagging (DST) information and data terms and compliance (DTC) information attached to the set of data;

access a set of application program interfaces (APIs), the set of APIs providing executable functionality for executing decision intelligence (DI) software;

perform modelling of the set of data in accordance with the user request, the modelling comprising inputting the set of data into each of the set of APIs;

generate, a labelled data model, the labelled data model being a comprehensive analytical data structure based on the set of data and comprising information indicating at least one label and tag, the label corresponding to a context of the data model, the tag corresponding to at least one policy controlling the set of data, the tag controlling access to and audits transformation of the set of data and environments where the set of data is used, the tag comprising jurisdictionally compliant privacy, governance and access control policies based on the GGM tagging; and execute the labelled data model in accordance with a smart contract, the smart contract comprising a structure that corresponds to types of usage of the labelled data model.

10. The device of claim 9, wherein the processor is further configured to:

output, over the network, for display, a user interface (UI), the UI providing a visual display of the analysis performed in the modelling of the set of data.

11. The device of claim 9, wherein the processor is further configured to:

generate at least one token, the at least one token enabling access to the stored labelled data model; and provide the at least one token to the user, the provided token being stored in a wallet of the user, wherein the smart contract further comprises information related to access and types of usage of the at least one token.

12. The device of claim 9, wherein the smart contract further comprises permissions for enabling modification to the labelled data model.

13. The device of claim 9, wherein the processor is further configured to:

store, over a network, the labelled data model in data storage, wherein the data storage comprises a block-chain.

14. The device of claim 9, wherein the processor is further configured to:

receive a request from a second user for the data model;

analyze the request, and determining that the request is approved, the determination being based on the smart contract;

provide a token to the second user, the token being provided via a wallet transfer; and provide access to the data model based on the token.

15. A non-transitory computer-readable storage medium tangibly encoded with computer-executable instructions that when executed by a device, perform a method comprising:

receiving, by the device, over a network, a request from a user, the request comprising information related to the user, the request further comprising information associated with a set of data;

determining, by the device, based on analysis of the set of data information, a format of the data;

determining, by the device, factorization features of the set of data;

determining, by the device, global grid monitor (GGM) tagging for the set of data, the GGM tagging comprising data sensitivity tagging (DST) information and data terms and compliance (DTC) information attached to the set of data;

accessing, by the device, a set of application program interfaces (APIs), the set of APIs providing executable functionality for executing decision intelligence (DI) software;

performing, by the device, modelling of the set of data in accordance with the user request, the modelling comprising inputting the set of data into each of the set of APIs;

generating, by the device, a labelled data model, the labelled data model being a comprehensive analytical data structure based on the set of data and comprising information indicating at least one label and tag, the label corresponding to a context of the data model, the tag corresponding to at least one policy controlling the set of data, the tag controlling access to and audits transformation of the set of data and environments where the set of data is used, the tag comprising jurisdictionally compliant privacy, governance and access control policies based on the GGM tagging; and executing, by the device, the labelled data model in accordance with a smart contract, the smart contract comprising a structure that corresponds to types of usage of the labelled data model.

16. The non-transitory computer-readable storage medium of claim 15, further comprising:

outputting, over the network, for display, a user interface (UI), the UI providing a visual display of the analysis performed in the modelling of the set of data.

17. The non-transitory computer-readable storage medium of claim 15, further comprising:

generating at least one token, the at least one token enabling access to the stored labelled data model; and providing the at least one token to the user, the provided token being stored in a wallet of the user, wherein the smart contract further comprises information related to access and types of usage of the at least one token.

18. The non-transitory computer-readable storage medium of claim 15, wherein the smart contract further comprises permissions for enabling modification to the labelled data model.

19. The non-transitory computer-readable storage medium of claim 15, further comprising:

storing, over a network, the labelled data model in data storage, wherein the data storage comprises a block-chain.

20. The non-transitory computer-readable storage medium of claim 15, further comprising:

receiving a request from a second user for the data model;

analyzing the request, and determining that the request is approved, the determination being based on the smart contract;

providing a token to the second user, the token being provided via a wallet transfer; and providing access to the data model based on the token.

* * * * *